United States Patent
Kahn et al.

(10) Patent No.: US 8,140,859 B1
(45) Date of Patent: Mar. 20, 2012

(54) SECURE STORAGE AND REPLAY OF MEDIA PROGRAMS USING A HARD-PAIRED RECEIVER AND STORAGE DEVICE

(75) Inventors: Raynold M. Kahn, Los Angeles, CA (US); Gregory J. Gagnon, Torrance, CA (US); David D. Ha, San Gabriel, CA (US); Peter M. Klauss, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1820 days.

(21) Appl. No.: 09/620,833

(22) Filed: Jul. 21, 2000

(51) Int. Cl.
*G06F 9/00* (2006.01)

(52) U.S. Cl. ......... 713/193; 380/277; 380/278; 380/284

(58) Field of Classification Search ............... 713/193, 713/200, 201
See application file for complete search history.

(56) References Cited

U.S. PATENT DOCUMENTS

| | | | |
|---|---|---|---|
| 4,613,901 A | 9/1986 | Gilhousen et al. | |
| 4,633,309 A | 12/1986 | Li et al. | |
| 4,675,732 A | 6/1987 | Oleson | |
| 4,694,490 A | 9/1987 | Harvey et al. | |
| 4,866,769 A | 9/1989 | Karp | |
| 4,866,787 A | 9/1989 | Olesen | |
| 4,881,264 A * | 11/1989 | Merkle ..................... | 713/177 |
| 4,941,176 A * | 7/1990 | Matyas et al. ............ | 380/280 |
| 5,029,207 A | 7/1991 | Gammie | |
| 5,033,084 A | 7/1991 | Beecher | |
| 5,111,504 A | 5/1992 | Esserman et al. | |
| 5,132,992 A | 7/1992 | Yurt et al. | |
| 5,168,353 A | 12/1992 | Walker et al. | |
| 5,172,413 A | 12/1992 | Bradley et al. | |
| 5,199,066 A | 3/1993 | Logan | |
| 5,301,245 A | 4/1994 | Endoh | |
| 5,301,352 A | 4/1994 | Nakagawa et al. | |
| 5,341,425 A | 8/1994 | Wasilewski | |
| 5,357,276 A | 10/1994 | Banker et al. | |

(Continued)

FOREIGN PATENT DOCUMENTS

EA 0002703 8/2002

(Continued)

OTHER PUBLICATIONS

P. Venkat Rangan et al., *Designing an On-Demand Multimedia Service*, IEEE Communications Magazine, Jul. 1992, vol. 30, No. 7, title page and pp. 56-64.

(Continued)

*Primary Examiner* — Benjamin Lanier

(57) ABSTRACT

A method and apparatus for storing and retrieving program material for subsequent replay is disclosed. The method comprises the steps of receiving a data stream comprising the program material encrypted according to a first encryption key, decrypting the program material; re-encrypting the program material according to a second encryption key; and storing the re-encrypted material in a media storage device. The program material is played back by retrieving the re-encrypted material from the media storage device and decrypting the re-encrypted program material. In one embodiment, the second encryption key is derived from metadata describing replay rights. In a further embodiment, the media storage device also stores the second encryption key which has been further encrypted by a key that is unique to the device used to receive the program material.

12 Claims, 5 Drawing Sheets

U.S. PATENT DOCUMENTS

| | | | |
|---|---|---|---|
| 5,371,551 A | 12/1994 | Logan et al. | |
| 5,386,587 A | 1/1995 | Yuzawa | |
| 5,396,293 A | 3/1995 | Shellard | |
| 5,421,031 A | 5/1995 | De Bey | |
| 5,438,423 A | 8/1995 | Lynch et al. | |
| 5,440,336 A | 8/1995 | Buhro et al. | |
| 5,495,531 A | 2/1996 | Smiedt | |
| 5,506,902 A | 4/1996 | Kubota | |
| 5,557,541 A | 9/1996 | Schulhof et al. | |
| 5,565,805 A | 10/1996 | Nakagawa et al. | |
| 5,583,937 A | 12/1996 | Ullrich et al. | |
| 5,586,264 A | 12/1996 | Belknap et al. | |
| 5,590,200 A | 12/1996 | Nachman et al. | |
| 5,592,551 A | 1/1997 | Lett et al. | |
| 5,592,651 A | 1/1997 | Rackman | |
| 5,594,491 A | 1/1997 | Hodge et al. | |
| 5,619,247 A | 4/1997 | Russo | |
| 5,640,453 A | 6/1997 | Schuchman et al. | |
| 5,642,418 A | 6/1997 | Farris et al. | |
| 5,663,896 A | 9/1997 | Aucsmith | |
| 5,675,390 A | 10/1997 | Schindler et al. | |
| 5,677,895 A | 10/1997 | Mankovitz | |
| 5,701,383 A | 12/1997 | Russo et al. | |
| 5,701,582 A | 12/1997 | De Bey | |
| 5,710,970 A | 1/1998 | Walters et al. | |
| 5,715,315 A | 2/1998 | Handelman | |
| 5,715,403 A | 2/1998 | Stefik | |
| 5,721,829 A | 2/1998 | Dunn et al. | |
| 5,724,646 A | 3/1998 | Ganek et al. | |
| 5,729,280 A | 3/1998 | Inoue et al. | |
| 5,734,853 A | 3/1998 | Hendricks et al. | |
| 5,748,732 A | 5/1998 | Le Berre et al. | |
| 5,761,302 A | 6/1998 | Park | |
| 5,764,762 A | 6/1998 | Kazmierczak et al. | |
| 5,784,095 A | 7/1998 | Robbins et al. | |
| 5,790,663 A | 8/1998 | Lee et al. | |
| 5,793,971 A | 8/1998 | Fujita et al. | |
| 5,805,699 A | 9/1998 | Akiyama et al. | |
| 5,826,165 A | 10/1998 | Echeita et al. | |
| 5,831,664 A | 11/1998 | Wharton et al. | |
| 5,845,240 A | 12/1998 | Fielder | |
| 5,848,158 A | 12/1998 | Saito et al. | |
| 5,850,218 A | 12/1998 | LaJoie et al. | |
| 5,864,747 A | 1/1999 | Clark et al. | |
| 5,867,207 A | 2/1999 | Chaney et al. | |
| 5,867,579 A * | 2/1999 | Saito | 705/57 |
| 5,899,582 A | 5/1999 | DuLac | |
| 5,912,969 A | 6/1999 | Sasamoto et al. | |
| 5,914,941 A | 6/1999 | Janky | |
| 5,926,205 A | 7/1999 | Krause et al. | |
| 5,930,215 A | 7/1999 | Fite et al. | |
| 5,933,500 A | 8/1999 | Blatter et al. | |
| 5,936,660 A | 8/1999 | Gurantz | |
| 5,937,067 A * | 8/1999 | Thatcher et al. | 380/212 |
| 5,953,418 A | 9/1999 | Bock et al. | |
| 5,966,186 A | 10/1999 | Shigihara et al. | |
| 5,973,756 A | 10/1999 | Erlin | |
| 5,978,649 A | 11/1999 | Kahn | |
| 5,999,628 A * | 12/1999 | Chan | 380/30 |
| 5,999,629 A * | 12/1999 | Heer et al. | 705/51 |
| 6,005,937 A | 12/1999 | Lee | |
| 6,011,511 A | 1/2000 | Chuong et al. | |
| 6,025,868 A | 2/2000 | Russo | |
| 6,055,314 A | 4/2000 | Spies et al. | |
| 6,055,566 A | 4/2000 | Kikinis | |
| 6,061,451 A | 5/2000 | Muratani et al. | |
| 6,061,452 A | 5/2000 | Suzuki | |
| 6,069,647 A | 5/2000 | Sullivan et al. | |
| 6,072,873 A | 6/2000 | Bewick | |
| 6,072,982 A | 6/2000 | Haddad | |
| 6,075,330 A | 6/2000 | Terk | |
| 6,091,883 A | 7/2000 | Artigalas et al. | |
| 6,097,441 A | 8/2000 | Allport | |
| 6,105,134 A | 8/2000 | Pinder et al. | |
| 6,144,400 A | 11/2000 | Ebisawa | |
| 6,148,081 A | 11/2000 | Szymanski et al. | |
| 6,154,206 A | 11/2000 | Ludtke | |
| 6,157,719 A | 12/2000 | Wasilewski et al. | |
| 6,157,949 A | 12/2000 | Cheng et al. | |
| 6,169,879 B1 | 1/2001 | Perlman | |
| 6,202,211 B1 | 3/2001 | Williams, Jr. | |
| 6,229,895 B1 | 5/2001 | Son et al. | |
| 6,240,401 B1 | 5/2001 | Oren et al. | |
| 6,263,504 B1 | 7/2001 | Ebisawa | |
| 6,266,480 B1 | 7/2001 | Ezaki et al. | |
| 6,266,481 B1 | 7/2001 | Lee et al. | |
| 6,286,142 B1 | 9/2001 | Ehreth | |
| 6,288,716 B1 | 9/2001 | Humpleman et al. | |
| 6,289,455 B1 | 9/2001 | Kocher et al. | |
| 6,317,883 B2 | 11/2001 | Marics | |
| 6,317,884 B1 | 11/2001 | Eames et al. | |
| 6,370,318 B1 | 4/2002 | Iwaki | |
| 6,370,688 B1 | 4/2002 | Hejna, Jr. | |
| 6,381,747 B1 | 4/2002 | Wonfor et al. | |
| 6,398,245 B1 | 6/2002 | Gruse et al. | |
| 6,415,031 B1 | 7/2002 | Colligan et al. | |
| 6,424,717 B1 * | 7/2002 | Pinder et al. | 380/239 |
| 6,437,836 B1 | 8/2002 | Huang et al. | |
| 6,456,985 B1 | 9/2002 | Ohtsuka | |
| 6,466,671 B1 | 10/2002 | Maillard et al. | |
| 6,466,921 B1 | 10/2002 | Cordery et al. | |
| 6,473,858 B1 | 10/2002 | Shimomura et al. | |
| 6,480,667 B1 | 11/2002 | O'Connor | |
| 6,487,663 B1 | 11/2002 | Jaisimha et al. | |
| 6,487,722 B1 | 11/2002 | Okura et al. | |
| 6,496,980 B1 | 12/2002 | Tillman et al. | |
| 6,502,139 B1 | 12/2002 | Birk et al. | |
| 6,510,519 B2 | 1/2003 | Wasilewski et al. | |
| 6,516,465 B1 | 2/2003 | Paskins | |
| 6,519,693 B1 | 2/2003 | De Bey | |
| 6,519,772 B1 | 2/2003 | Bopardikar | |
| 6,530,085 B1 | 3/2003 | Perlman | |
| 6,542,870 B1 | 4/2003 | Matsumoto | |
| 6,550,011 B1 | 4/2003 | Sims, III | |
| 6,560,340 B1 | 5/2003 | Akins et al. | |
| 6,574,609 B1 | 6/2003 | Downs et al. | |
| 6,588,017 B1 | 7/2003 | Calderone | |
| 6,611,812 B2 | 8/2003 | Hurtado et al. | |
| 6,654,547 B1 | 11/2003 | Maeda et al. | |
| 6,655,580 B1 | 12/2003 | Ergo et al. | |
| 6,681,326 B2 | 1/2004 | Son et al. | |
| 6,697,489 B1 | 2/2004 | Candelore | |
| 6,714,650 B1 | 3/2004 | Maillard et al. | |
| 6,748,080 B2 | 6/2004 | Russ et al. | |
| 6,804,357 B1 | 10/2004 | Ikonen et al. | |
| 6,853,728 B1 | 2/2005 | Kahn et al. | |
| 6,889,208 B1 | 5/2005 | Okabe et al. | |
| 6,904,522 B1 | 6/2005 | Benardeau et al. | |
| 6,912,513 B1 | 6/2005 | Candelore | |
| 6,934,963 B1 | 8/2005 | Reynolds et al. | |
| 6,961,858 B2 | 11/2005 | Fransdonk | |
| 6,985,591 B2 | 1/2006 | Graunke | |
| 6,993,499 B2 | 1/2006 | Gagnon et al. | |
| 7,007,170 B2 | 2/2006 | Morten | |
| 7,035,827 B2 | 4/2006 | Ezaki | |
| 7,036,011 B2 | 4/2006 | Grimes et al. | |
| 7,058,802 B1 * | 6/2006 | Epstein et al. | 713/150 |
| 7,093,295 B1 | 8/2006 | Saito | |
| 7,099,946 B2 | 8/2006 | Lennon et al. | |
| 7,177,911 B2 | 2/2007 | deCarmo | |
| 7,191,335 B1 | 3/2007 | Maillard | |
| 7,228,439 B2 | 6/2007 | Sasselli | |
| 7,231,450 B1 | 6/2007 | Clifford et al. | |
| 7,277,928 B2 | 10/2007 | Lennon | |
| 7,298,849 B2 | 11/2007 | Graunke | |
| 7,328,455 B2 | 2/2008 | Jutzi et al. | |
| 7,403,618 B2 | 7/2008 | Van Rijnsoever et al. | |
| 7,461,249 B1 | 12/2008 | Pearson et al. | |
| 7,492,897 B1 | 2/2009 | Eskicioglu et al. | |
| 7,539,307 B2 | 5/2009 | Lotspiech et al. | |
| 2001/0001876 A1 | 5/2001 | Morgan et al. | |
| 2001/0046299 A1 | 11/2001 | Wasilewski et al. | |
| 2001/0053979 A1 | 12/2001 | Kori | |
| 2002/0001386 A1 | 1/2002 | Akiyama | |
| 2002/0002674 A1 | 1/2002 | Grimes et al. | |
| 2002/0023219 A1 | 2/2002 | Treffersi et al. | |
| 2002/0048367 A1 | 4/2002 | Maillard et al. | |

| | | |
|---|---|---|
| 2002/0056112 A1 | 5/2002 | Dureau et al. |
| 2002/0094084 A1 | 7/2002 | Wasilewski et al. |
| 2002/0112243 A1 | 8/2002 | Hunter et al. |
| 2002/0162104 A1 | 10/2002 | Raike et al. |
| 2002/0166121 A1 | 11/2002 | Rovira |
| 2002/0169971 A1 | 11/2002 | Asano et al. |
| 2002/0170054 A1 | 11/2002 | Kudelski et al. |
| 2003/0005285 A1 | 1/2003 | Graunke |
| 2003/0026428 A1 | 2/2003 | Loisel |
| 2003/0037006 A1 | 2/2003 | Maruyama et al. |
| 2003/0040962 A1 | 2/2003 | Lewis et al. |
| 2003/0061477 A1 | 3/2003 | Kahn et al. |
| 2003/0097622 A1 | 5/2003 | Liu et al. |
| 2003/0105718 A1 | 6/2003 | Hurtado et al. |
| 2003/0110132 A1 | 6/2003 | Sako |
| 2003/0131349 A1 | 7/2003 | Kuczynski-Brown |
| 2003/0131353 A1 | 7/2003 | Blom et al. |
| 2003/0145183 A1 | 7/2003 | Muehring |
| 2003/0174844 A1 | 9/2003 | Candelore |
| 2003/0188164 A1 | 10/2003 | Okimoto |
| 2003/0190149 A1 | 10/2003 | Chang et al. |
| 2003/0228911 A1 | 12/2003 | Dernis et al. |
| 2004/0032950 A1 | 2/2004 | Graunke |
| 2004/0068747 A1 | 4/2004 | Robertson et al. |
| 2004/0073954 A1 | 4/2004 | Bjordammen et al. |
| 2004/0148634 A1 | 7/2004 | Arsenault et al. |
| 2004/0190721 A1 | 9/2004 | Barrett et al. |
| 2005/0039025 A1 | 2/2005 | Main et al. |
| 2005/0050333 A1 | 3/2005 | Yeap et al. |
| 2005/0071280 A1 | 3/2005 | Irwin et al. |
| 2005/0091681 A1 | 4/2005 | Borden et al. |
| 2005/0108519 A1 | 5/2005 | Barton et al. |
| 2005/0144248 A1 | 6/2005 | Doganowski et al. |
| 2005/0144468 A1 | 6/2005 | Northcutt et al. |
| 2005/0169468 A1 | 8/2005 | Fahrny et al. |
| 2005/0182931 A1 | 8/2005 | Robert et al. |
| 2005/0183112 A1 | 8/2005 | Duval |
| 2005/0235361 A1 | 10/2005 | Alkove et al. |
| 2005/0249350 A1 | 11/2005 | Kahn et al. |
| 2006/0015750 A1 | 1/2006 | Ashley et al. |
| 2006/0031873 A1 | 2/2006 | Fahrny et al. |
| 2006/0039560 A1 | 2/2006 | Wasilewski |
| 2006/0039565 A1 | 2/2006 | Kim et al. |
| 2006/0168663 A1 | 7/2006 | Viljoen et al. |
| 2006/0179489 A1 | 8/2006 | Mas Ribes |
| 2007/0092077 A1 | 4/2007 | Yoshida et al. |
| 2007/0092078 A1 | 4/2007 | Yoshida et al. |
| 2007/0198414 A1 | 8/2007 | Derrenberger |

FOREIGN PATENT DOCUMENTS

| | | |
|---|---|---|
| EP | 0677949 | 10/1995 |
| EP | 0710017 A2 | 5/1996 |
| EP | 0 936 812 A1 | 8/1999 |
| EP | 0 975 165 A2 | 1/2000 |
| EP | 0 989 557 A1 | 3/2000 |
| EP | 0989557 | 3/2000 |
| EP | 1156676 A2 | 11/2001 |
| EP | 1304871 A2 | 4/2003 |
| EP | 1369152 A2 | 12/2003 |
| EP | 1418701 | 5/2004 |
| GB | 2272822 | 5/1994 |
| GB | 2354392 | 3/2001 |
| JP | 4-288743 | 10/1992 |
| JP | 06351023 A | 12/1994 |
| JP | 8-125651 A | 5/1996 |
| JP | 08-287014 | 11/1996 |
| JP | 8287014 | 11/1996 |
| JP | 10-13784 | 1/1998 |
| JP | 11136708 A | 5/1999 |
| JP | 11-232776 | 8/1999 |
| JP | 2000122933 A | 4/2000 |
| JP | 2001-203686 | 7/2001 |
| WO | WO 92/11713 | 7/1992 |
| WO | 99/09743 | 2/1999 |
| WO | 9907150 A1 | 2/1999 |
| WO | 9909743 | 2/1999 |
| WO | WO 99/18729 | 4/1999 |
| WO | 99/41907 A1 | 8/1999 |
| WO | 0008909 A2 | 2/2000 |
| WO | WO 00/13412 | 3/2000 |
| WO | WO 00/14967 | 3/2000 |
| WO | WO 00/19294 | 4/2000 |
| WO | 00/56068 A1 | 9/2000 |
| WO | WO 01/37546 | 5/2001 |
| WO | WO 0143444 A2 | 6/2001 |
| WO | 0165762 | 9/2001 |
| WO | 01/98903 A1 | 12/2001 |
| WO | WO 01/99422 | 12/2001 |
| WO | WO 0215184 A1 | 2/2002 |
| WO | WO 02065750 A2 | 8/2002 |
| WO | 2004/014075 A2 | 2/2004 |
| WO | WO 2004/017637 | 2/2004 |
| WO | WO 2004/057871 | 7/2004 |
| WO | WO 2004/082286 | 9/2004 |

OTHER PUBLICATIONS

Wanjiun Liao et al., *The Split and Merge Protocol for Interactive Video-On-Demand*, IEEE MultiMedia, Oct.-Dec. 1997, vol. 4, No. 4, index and pp. 51-62.

Robert Johnston et al., *A Digital Television Sequence Store*, IEEE Transactions on Communications, May 1978, vol. COM-26, No. 5, index and pp. 594-600.

*Proposed SMPTE Standard for Television—Splice Points for MPEG-2 Transport Streams*, SMPTE Journal, Oct. 1998, SMPTE 312M, pp. 916-925.

Michael Robin et al., *Digital Television Fundamentals—Design and Installation of Video and Audio Systems*, McGraw-Hill, Chapter 8, title page(s) and pp. 345-425.

Yongchen Li, et al., *Security Enchanced MPEG Player*, IEEE, 1996, pp. 169-175.

Fink, *Ready to take the dive? It's fast-forward as new DVD and Divx formats hit market (includes graphic: Home video: the next generation plus: Some selections that show off the system)*, York Daily Record, Dec. 21, 1998, pp. 1-3.

Sin-Joo Lee, et al., *A Survey of Watermarking Techniques Applied to Multimedia*, IEEE, 2001, pp. 272-277.

*PocketTV Brings Video to Palm-size PC*, Mar. 9, 2000, 2 pages.

1st Report of EBU/SMPTE Task Force for Harmonized Standards for the Exchange of Television Program Material as Bit Streams, May 6, 1997, Version 1.30, pp. 1-73.

B. Schneier, *Applied Cryptography—Protocols, Algorithms, and Source Code in C*, 2nd Edition, pp. 216-222, 357-362.

*HP Jornada 430/430se Palm-size PC: User's Guide*, Hewlett Packard, 1999, pp. 7-9.

PocketTV-MPEG movie player for Pocket PC and WinCE, May 17, 2000, MPEG TV, LLC, retrieved from URL: http://web.archive.org/web/200006210123803/www.mpegtv.com/wince/pockettv/index.html.

Download PockeTV (beta) for WinCE, Nov. 3, 1999, MPEG TV, LLC, retrieved from URL: http://web.archive.org/web/19991127093158/www.mpegtv.com/wince/pockettv/index.html.

Anerousis, N., "SkyCast: The Satellite Digital Broadcast Relay Service", AT&T Labs Research, unpublished manuscript, 1999, pp. 1-4.

Ma, Huangon; Shin, Kang G.; "Multicast Video on Demand Services"; ACM SIGCOMM Computer Communication Review; vol. 32, Issue 1; Jan. 2002; pp. 31-43; ACM Press; New York, NY.

RSA Laboratories; "PKCS #1 v2.1: RSA Cryptography Standard"; Jun. 14, 2002; 61 pages.

Koga, Keiichiro; "Security for Information Data Broadcasting System with Conditional Access Control"; IEEE 1995.

EBU Project Group B/CA; "Functional Model of a Conditional Access System"; EBU Technical Review; Jun. 10, 1995.

Tantaoui, Mounir A.; Hua, Kien A.; Sheu, Simon; "Interaction with Broadcast Video"; International Multimedia Conference Proceedings of the 10th ACM International Conference on Multimedia; Dec. 1-6, 2002; Juan-les-Pins, France; pp. 29-38; ACM Press; New York, NY; ISBN: 1-58113-620-X.

Griwodz, Carsten; Merkel, Oliver; Dittmann, Jana; Steinmetz, Ralf; "Protecting VoD the Easier Way"; International Multimedia Conference Proceedings of the 6th ACM International Conference on Multmedia; ACM Multimedia 1998; Bristol, United Kingdom; pp. 21-28; ACM Press; New York, NY; ISBN: 0-201-30990-4.

EPO Communication dated Sep. 14, 2004 in counterpart European patent application No. 01117556.9.
EPO Communication dated Mar. 5, 2007 in counterpart European patent application No. 01117556.9.
Japanese Office Communication dated Aug. 17, 2004 in counterpart Japanese patent application No. 2001-222191.
Japanese Decision of Rejection dated Dec. 14, 2004 in counterpart Japanese patent application No. 2001-222191.
Tsubakiyama, Hideki and Koga, Keiichiro; "Security for Information Data Broadcasting System with Conditional-Access Control"; IEEE; 1993; pp. 164-170.
EBU Project Group B/CA; "Functional Model of a Conditional Access System"; EBU Technical Review; Jun. 10, 1995; pp. 64-77.
U.S. Appl. No. 10/758,865, filed Jan. 16, 2004, Raynold M. Kahn, Non-final Office action dated Sep. 25, 2007.
U.S. Appl. No. 10/758,818, filed Jan. 16, 2004, Raynold M. Kahn, Final Rejection dated Aug. 20, 2007.
U.S. Appl. No. 10/790,466, filed Mar. 1, 2004, Stephen P. Dulac, Final Rejection dated Oct. 10, 2007.
Notice of Allowance dated Dec. 5, 2006 in U.S. Appl. No. 09/620,773, filed Jul. 21, 2000 by Raynold M. Kahn et al.
Non-final Office Action dated Jul. 19, 2006 in U.S. Appl. No. 09/620,773, filed Jul. 21, 2000 by Raynold M. Kahn et al.
Notice of Allowance dated Mar. 11, 2005 in U.S. Appl. No. 09/620,773, filed Jul. 21, 2000 by Raynold M. Kahn et al.
Non-final Office Action dated Aug. 25, 2004 in U.S. Appl. No. 09/620,773, filed Jul. 21, 2000 by Raynold M. Kahn et al.
Non-final Office Action dated Feb. 26, 2004 in U.S. Appl. No. 09/620,773, filed Jul. 21, 2000 by Raynold M. Kahn et al.
EPO Notice of Allowance dated Oct. 29, 2007 in European counterpart Application No. 01 117 556.9 of U.S. Appl. No. 09/620,833, filed Jul. 21, 2000 by Raynold M. Kahn et al.
Notice of Allowance dated Oct. 19, 2006 in U.S. Appl. No. 09/621,476, filed Jul. 21, 2000 by Raynold M. Kahn et al., now issued Apr. 10, 2007 as U.S. Patent No. 7,203,311.
Non-final Office Action dated Jul. 14, 2005 in U.S. Appl. No. 09/621,476, filed Jul. 21, 2000 by Raynold M. Kahn et al., now issued Apr. 10, 2007 as U.S. Patent No. 7,203,311.
Non-final Office Action dated Jan. 27, 2005 in U.S. Appl. No. 09/621,476, filed Jul. 21, 2000 by Raynold M. Kahn et al., now issued Apr. 10, 2007 as U.S. Patent No. 7,203,311.
Non-final Office Action dated May 24, 2004 in U.S. Appl. No. 09/621,476, filed Jul. 21, 2000 by Raynold M. Kahn et al., now issued Apr. 10, 2007 as U.S. Patent No. 7,203,311.
EPO Communication dated Apr. 25, 2007 in European counterpart Application No. 01 117 554.4 of U.S. Appl. No. 09/621,476, filed Jul. 21, 2000 by Raynold M. Kahn et al., now issued Apr. 10, 2007 as U.S. Patent No. 7,203,311.
EPO Communication dated Sep. 14, 2004 in European counterpart Application No. 01 117 554.4 of U.S. Appl. No. 09/621,476, filed Jul. 21, 2000 by Raynold M. Kahn et al., now issued Apr. 10, 2007 as U.S. Patent No. 7,203,311.
Japanese Decision of Rejection dated Dec. 14, 2004 in Japanese counterpart Application No. 2001-222222 of U.S. Appl. No. 09/621,476, filed Jul. 21, 2000 by Raynold M. Kahn et al., now issued Apr. 10, 2007 as U.S. Patent No. 7,203,311.
Japanese Office Action dated Aug. 17, 2004 in Japanese counterpart Application No. 2001-222222 of U.S. Appl. No. 09/621,476, filed Jul. 21, 2000 by Raynold M. Kahn et al., now issued Apr. 10, 2007 as U.S. Patent No. 7,203,311.
Notice of Allowance dated Sep. 22, 2004 in U.S. Appl. No. 09/620,832, filed Jul. 21, 2000 by Raynold M. Kahn et al., now issued Feb. 8, 2005 as U.S. Patent No. 6,853,728.
Non-final Office Action dated Sep. 11, 2003 in U.S. Appl. No. 09/620,832, filed Jul. 21, 2000 by Raynold M. Kahn et al., now issued Feb. 8, 2005 as U.S. Patent No. 6,853,728.
Japanese Decision of Rejection dated Feb. 8, 2005 in Japanese counterpart Application No. 2001-222229 of U.S. Appl. No. 09/620,832, filed Jul. 21, 2000 by Raynold M. Kahn et al., now issued Feb. 8, 2005 as U.S. Patent No. 6,853,728.

Japanese Office Action dated Jul. 6, 2004 in Japanese counterpart Application No. 2001-222229 of U.S. Appl. No. 09/620,832, filed Jul. 21, 2000 by Raynold M. Kahn et al., now issued Feb. 8, 2005 as U.S. Patent No. 6,853,728.
EPO Decision of Refusal dated Mar. 8, 2007 in European counterpart Application No. 01 117 553.6 of U.S. Appl. No. 09/620,832, filed Jul. 21, 2000 by Raynold M. Kahn et al., now issued Feb. 8, 2005 as U.S. Patent No. 6,853,728.
EPO Communication dated Sep. 14, 2004 in European counterpart Application No. 01 117 553.6 of U.S. Appl. No. 09/620,832, filed Jul. 21, 2000 by Raynold M. Kahn et al., now issued Feb. 8, 2005 as U.S. Patent No. 6,853,728.
Non-final Office Action dated Jul. 26, 2007 in U.S. Appl. No. 09/620,772, filed Jul. 21, 2000 by Raynold M. Kahn et al.
Non-final Office Action dated Jan. 22, 2007 in U.S. Appl. No. 09/620,772, filed Jul. 21, 2000 by Raynold M. Kahn et al.
Non-final Office Action dated Aug. 15, 2006 in U.S. Appl. No. 09/620,772, filed Jul. 21, 2000 by Raynold M. Kahn et al.
Notice of Allowance dated May 10, 2005 in U.S. Appl. No. 09/620,772, filed Jul. 21, 2000 by Raynold M. Kahn et al.
Non-final Office Action dated Oct. 20, 2004 in U.S. Appl. No. 09/620,772, filed Jul. 21, 2000 by Raynold M. Kahn et al.
Non-final Office Action dated Mar. 1, 2004 in U.S. Appl No. 09/620,772, filed Jul. 21, 2000 by Raynold M. Kahn et al.
Japanese Decision of Rejection dated Mar. 7, 2006 in Japanese counterpart Application No. 2001-222227 of U.S. Appl. No. 09/620,772, filed Jul. 21, 2000 by Raynold M. Kahn et al.
Japanese Office Action dated Aug. 17, 2004 in Japanese counterpart Application No. 2001-222227 of U.S. Appl. No. 09/620,772, filed Jul. 21, 2000 by Raynold M. Kahn et al.
EPO Notice of Allowance dated Nov. 22, 2007 in European counterpart Application No. 01 117 555.1 of U.S. Appl. No. 09/620,772, filed Jul. 21, 2000 by Raynold M. Kahn et al.
EPO Minutes of the Oral Proceedings dated Nov. 16, 2007 in European counterpart Application No. 01 117 555.1 of U.S. Appl. No. 09/620,772, filed Jul. 21, 2000 by Raynold M. Kahn et al.
EPO Summons to Attend Oral Proceedings dated Mar. 26, 2007 in European counterpart Application No. 01 117 555.1 of U.S. Appl. No. 09/620,772, filed Jul. 21, 2000 by Raynold M. Kahn et al.
EPO Communication dated Sep. 17, 2004 in European counterpart Application No. 01 117 555.1 of U.S. Appl. No. 09/620,772, filed Jul. 21, 2000 by Raynold M. Kahn et al.
Notice of Allowance dated Apr. 18, 2007 in U.S. Appl. No. 09/960,824, filed Sep. 21, 2001 by Raynold M. Kahn et al.
Advisory Action dated Jun. 22, 2006 in U.S. Appl. No. 09/960,824, filed Sep. 21, 2001 by Raynold M. Kahn et al.
Final Rejection dated Apr. 14, 2006 in U.S. Appl. No. 09/960,824, filed Sep. 21, 2001 by Raynold M. Kahn et al.
Non-final Office Action dated Oct. 31, 2005 in U.S. Appl. No. 09/960,824, filed Sep. 21, 2001 by Raynold M. Kahn et al.
EPO Communication dated Jun. 22, 2007 in U.S. Appl. No. 09/960,824, filed Sep. 21, 2001.
EPO Communication dated Oct. 15, 2007 in U.S. Appl. No. 09/960,824, filed Sep. 21, 2001.
Japanese Office Action dated Mar. 27, 2007 in Japanese counterpart Application No. 2003-535391 of U.S. Appl. No. 09/960,824, filed Sep. 21, 2001.
Non-final Office Action dated Jan. 18, 2008 in U.S. Appl. No. 10/759,679, filed Jan. 19, 2004 by Arsenault et al.
Notice of Allowance dated Dec. 10, 2007 in U.S. Appl. No. 09/960,824, filed Sep. 21, 2001 by Kahn et al.
Non-final Office Action dated Dec. 4, 2007 in U.S. Appl. No. 10/758,811, filed Jan. 16, 2004 by Kahn et al.
Final Office Action dated Jan. 23, 2008 in U.S. Appl. No. 09/620,772, filed Jul. 21, 2000 by Kahn et al.
Advisory Action dated Jan. 7, 2008 in U.S. Appl. No. 10/790,466, filed Mar. 1, 2004 by Dulac, Stephen P.
Non-final Office Action dated Mar. 17, 2008 in U.S. Appl. No. 11/701,800, filed Feb. 2, 2007 by Raynold M. Kahn et al.
"PKCS #1 v2.1: RSA Cryptography Standard"; Jun. 14, 2002; RSA Laboratories; 61 pages.
Japanese Office Action dated Nov. 11, 2008 in Japanese Patent Application No. 2001-222222 filed Jul. 23, 2001 by Raynold M. Kahn et al.

Japanese Office Action dated Jun. 10, 2008 in Japanese counterpart Application No. 2005-04430 corresponding to U.S. Appl. No. 09/620,833, filed Jul. 21, 2000 by Raynold M. Kahn et al.

Japanese Office Action dated Jun. 17, 2008 in Japanese counterpart Application No. 2001-222222 corresponding to U.S. Appl. No. 09/621,476, filed Jul. 21, 2000 by Raynold M. Kahn et al., now issued Apr. 10, 2007 as US Patent No. 7,203,311.

Notice of Allowance dated Sep. 12, 2008 in U.S. Appl. No. 11/701,800, filed Feb. 2, 2007 by Raynold Kahn et al.

Notice of Allowance dated May 12, 2010 in U.S. Appl. No. 12/184,957, filed Aug. 1, 2008 by Raynold M. Kahn et al.

Final Rejection dated Jun. 10, 2010 in U.S. Appl. No. 12/172,901, filed Jul. 14, 2008 by Raynold M. Kahn et al.

English translation of Appeal Decision of Rejection dated Oct. 13, 2009 in Japanese Patent Application No. 2001-222227 filed Jul. 23, 2001 by Raynold M. Kahn et al.; 16 pages.

EPO Communication dated Oct. 6, 2010 in European Patent Application No. 02789164.7 filed Sep. 20, 2002 by Raynold M. Kahn et al.

Japanese Office action dated Sep. 7, 2010 in Japanese divisional Patent Application No. 2007-167743 filed Jun. 26, 2007 by Raynold M. Kahn et al.

Japanese Office action dated Sep. 7, 2010 in Japanese divisional Patent Application 2007-167744 filed Jun. 26, 2007 by Raynold M. Kahn et al.

Partial machine translation from Japanese Patent Office generated Oct. 12, 2010 of Japanese Patent JP3429660B granted Jul. 22, 2003 by Yamada et al./Matsushita Electric Ind. Co. (previously cited Jun. 30, 2010 as English abstract of Japanese Publication No. 11232776A).

Japanese Decision of Rejection dated Mar. 29, 2011 in Japanese Patent Application No. 2007-167743 filed Jun. 26, 2007 by Raynold M. Kahn et al.

Non-final Office action dated Nov. 6, 2009 in U.S. Appl. No. 12/184,957, filed Aug. 1, 2008 by Raynold M. Kahn et al.

Japanese Office Action dated Feb. 17, 2009 in Japanese Patent Application No. 2001-222227 filed Jul. 23, 2001 by Raynold M. Kahn et al.

Non-final Office action dated Dec. 1, 2009 in U.S. Appl. No. 12/172,901, filed Jul. 14, 2008 by Raynold M. Kahn et al.

* cited by examiner

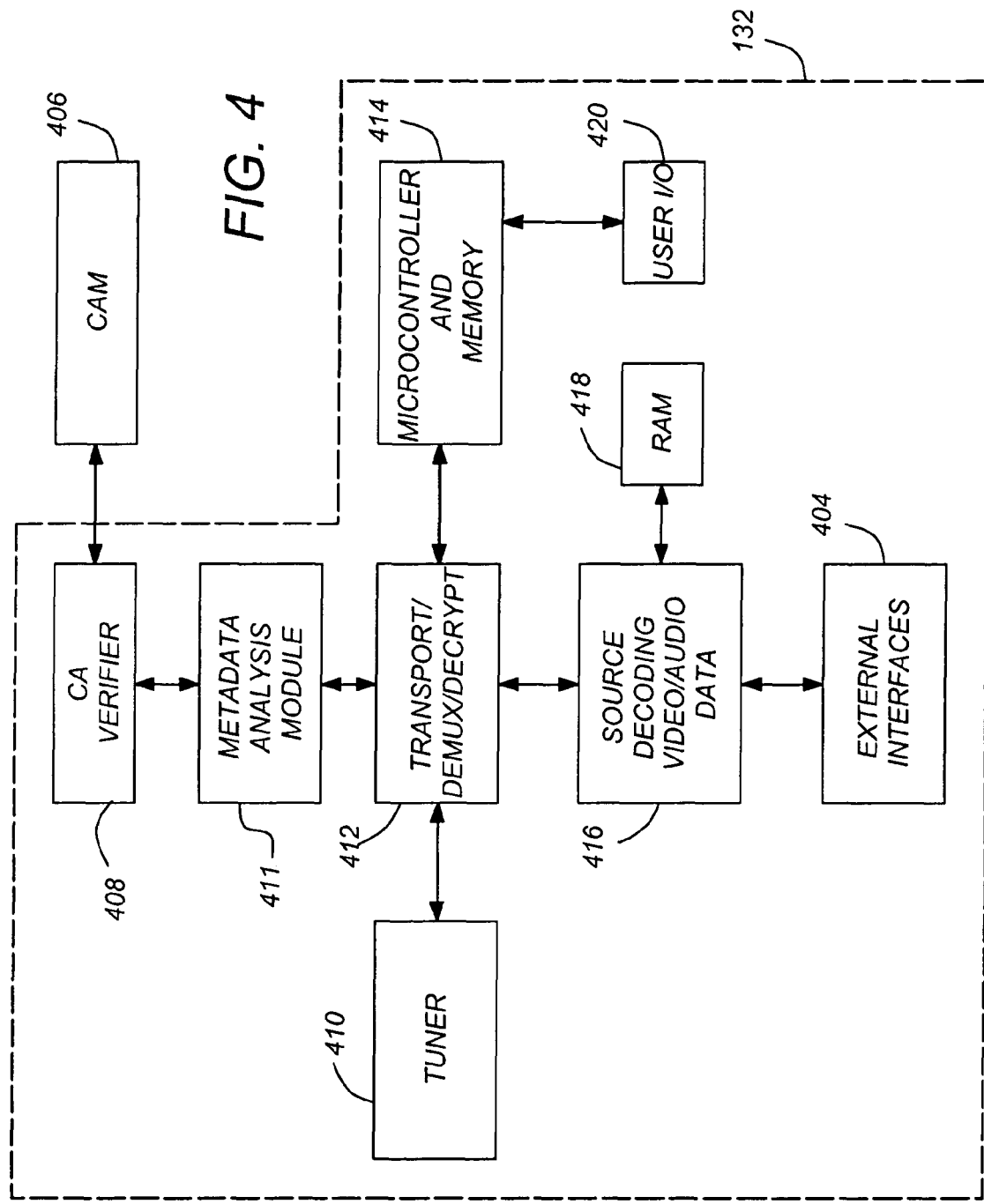

SECURE STORAGE AND REPLAY OF MEDIA PROGRAMS USING A HARD-PAIRED RECEIVER AND STORAGE DEVICE

CROSS-REFERENCE TO RELATED APPLICATIONS

This application is related to the following patent applications, all of which applications are hereby incorporated by reference herein:

U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on Jul. 21, 2000, now issued as U.S. Pat. No. 7,203,311;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory). Gagnon, David D. Ha, Peter M. Klauss, Christopher P. Curren, and Thomas H. James, filed on Jul. 21, 2000;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY," by Raynold M. Kahn, Gregory J. Gagnon, David D. Ha, Peter M. Klauss, Christopher P. Curren, and Thomas H. James, filed on Jul. 21, 2000, now issued as U.S. Pat. No. 7,203,314;

U.S. patent application Ser. No. 09/620,832, entitled "VIDEO ON DEMAND PAY PER VIEW SERVICES WITH UNMODIFIED CONDITIONAL ACCESS FUNCTIONALITY" by Raynold M. Kahn, Gregory J. Gagnon, David D. Ha, Peter M. Klauss, Christopher P. Curren, and Thomas H. James, filed on Jul. 21, 2000, now issued as U.S. Pat. No. 6,853,728; and U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000, now issued as U.S. Pat. No. 6,701,528.

This application is also related to the following applications:

application Ser. No. 09/590,417, entitled "METHOD AND APPARATUS FOR TRANSMITTING, RECEIVING, AND UTILIZING AUDIO/VISUAL SIGNALS AND OTHER INFORMATION", filed Jun. 8, 2000, by Arthur Tilford;

application Ser. No. 09/960,824 entitled "METHOD AND APPARATUS FOR ENCRYPTING MEDIA PROGRAMS FOR LATER PURCHASE AND VIEWING", filed Sep. 21, 2001, by Raynold M. Kahn et al.;

application Ser. No. 10/490,261 entitled "METHOD AND APPARATUS FOR CONTROLLING PAIRED OPERATION OF A CONDITIONAL ACCESS MODULE AND AN INTEGRATED RECEIVER AND DECODER", filed Aug. 5, 2004, by Raynold M. Kahn et al., which is a national stage entry of PCT/US02/29881 filed Sep. 20, 2002;

application Ser. No. 10/758,811 entitled "DISTRIBUTION OF VIDEO CONTENT USING A TRUSTED NETWORK KEY FOR SHARING CONTENT", filed Jan. 16, 2004, by Raynold M. Kahn et al;

application Ser. No. 10/758,818 entitled "DISTRIBUTION OF BROADCAST CONTENT FOR REMOTE DECRYPTION AND VIEWING", filed Jan. 16, 2004, by Raynold M. Kahn et al;

application Ser. No. 10/758,865 entitled "DISTRIBUTION OF VIDEO CONTENT USING CLIENT TO HOST PAIRING OF INTEGRATED RECEIVERS/DECODERS", filed Jan. 16, 2004, by Raynold M. Kahn et al;

application Ser. No. 10/790,466 entitled "VIDEO ON DEMAND IN A BROADCAST NETWORK", filed Mar. 1, 2004, by Stephen P. Dulac;

application Ser. No. 11/433,926 entitled "METHODS AND APPARATUS TO PROTECT CONTENT IN HOME NETWORKS", filed May 15, 2006, by Raynold M. Kahn;

application Ser. No. 11/433,969 entitled "METHODS AND APPARATUS TO PROVIDE CONTENT ON DEMAND IN CONTENT BROADCAST SYSTEMS", filed May 15, 2006, by Peter M. Klauss et al.;

application Ser. No. 11/434,082 entitled "CONTENT DELIVERY SYSTEMS AND METHODS TO OPERATE THE SAME", filed May 15, 2006, by Raynold M. Kahn et al.;

application Ser. No. 11/434,404 entitled "SECURE CONTENT TRANSFER SYSTEMS AND METHODS TO OPERATE THE SAME", filed May 15, 2006, by Raynold M. Kahn et al;

application Ser. No. 11/434,437 entitled "METHODS AND APPARATUS TO CONDITIONALLY AUTHORIZE CONTENT DELIVERY AT RECEIVERS IN PAY DELIVERY SYSTEMS", filed May 15, 2006, by Raynold M. Kahn et al.;

application Ser. No. 11/434,528 entitled "METHODS AND APPARATUS TO CONDITIONALLY AUTHORIZE CONTENT DELIVERY AT BROADCAST HEADENDS IN PAY DELIVERY SYSTEMS", filed May 15, 2006, by Raynold M. Kahn et al.;

application Ser. No. 11/434,538 entitled "METHODS AND APPARATUS TO CONDITIONALLY AUTHORIZE CONTENT DELIVERY AT CONTENT SERVERS IN PAY DELIVERY SYSTEMS", filed May 15, 2006, by Raynold M. Kahn et al.;

application Ser. No. 11/499,635 entitled "DISTRIBUTED MEDIA-PROTECTION SYSTEMS AND METHODS TO OPERATE THE SAME", filed Aug. 4, 2006, by Michael Ficco;

application Ser. No. 11/499,636 entitled "DISTRIBUTED MEDIA-AGGREGATION SYSTEMS AND METHODS TO OPERATE THE SAME", filed Aug. 4, 2006, by Michael Ficco;

application Ser. No. 11/501,985 entitled "SECURE DELIVERY OF PROGRAM CONTENT VIA A REMOVAL STORAGE MEDIUM", filed Aug. 10, 2006, by Raynold M. Kahn et al.; and application Ser. No. 11/654,752 entitled "SECURE STORAGE AND REPLAY OF MEDIA PROGRAMS USING A HARD-PAIRED RECEIVER AND STORAGE DEVICE", filed Jan. 18, 2007, by Raynold M. Kahn et al., which is a continuation of application Ser. No. 09/620,833, entitled "SECURE STORAGE AND REPLAY OF MEDIA PROGRAMS USING A HARD-PAIRED RECEIVER AND STORAGE DEVICE", filed Jul. 21, 2000, by Raynold M. Kahn et al., which application is hereby incorporated by reference.

BACKGROUND OF THE INVENTION

1. Field of the Invention

The present invention relates to systems and niethods for providing video program material to subscribers, and in particular to a method and system for securely storing and replaying media programs.

2. Description of the Related Art

In recent years, there has been increasing interest in allowing cable and satellite television subscribers to record broadcast media programs for later viewing. This capability, hereinafter referred to as personal video recording (PVR), can be used to provide video-on-demand (VOD) services, or simply to allow the subscriber to save media programs for repeated viewing and/or archival purposes.

In the past, video cassette tape recorders (VCRs) have been used for such personal video recording. Recently, however, hard disks, similar to those used in personal computers, have been used to store media programs for later viewing. Unlike VCRs, such devices typically do not include a tuner, and are instead coupled to the satellite receiver or cable box. Also unlike VCRs, these devices are typically used to record digital content, not analog video. This difference is both advantageous and disadvantageous.

An advantage of such devices is that they permit long term storage and multiple replays without substantial degradation. Another advantage is that they permit more rapid trick-play functions such as fast forwarding and rewinding. A disadvantage of such devices is that they are capable of making multiple-generation copies of the program material as well, and without serious degradation. This raises the very real possibility that the multiple generation copies of the media programs will be produced and distributed without permission. This possibility has caused some media providers to be reluctant to allow their media programs to be recorded by such devices.

To ameliorate this problem, it is critical to protect the stored media programs with strong security and copy control. Current devices, do not scramble media programs before storage, nor do they store copy protection information. Instead, such devices record decrypted program content into the storage disk using a paired hardware scheme in which the hard disk controller and hard disk are paired to each other specifically through a specific interface. Because the hard disk controller and the disk itself are essentially paired together, storage or playback will not function if the disk were to be removed and transferred to another player. The weakness of this security scheme is that it relies only on the paired hardware to ensure security . . . the media programs stored on the disk drive itself are not encrypted.

While it would presumably be possible to simply store the datastream as it is received from the broadcaster for later replay, this technique has distinct disadvantages. One such disadvantage is that it would provide pirates a permanently recorded version of the encrypted datastream, thus providing the pirate with information that can be used to perform detailed analyses of the datastream itself to determine the encryption techniques and codes.

What is needed is a system and method for securely recording broadcast media programs (including impulse purchase pay-per-view programs) for limited use playback at a later time. Such a system could be used to support video-on-demand (VOD), thus allowing the subscriber to purchase media programs and games from the set top box instantly without worrying about the start time of the program. What is also needed is a system and method that does not require substantial changes to subscriber hardware, such as the integrated receiver/decoder (IRD), or the conditional access module (CAM) that is used to provide a key to decrypt the media programs for presentation to the subscribers.

SUMMARY OF THE INVENTION

In summary, the present invention describes a system and method for storing and retrieving program material for subsequent replay. The method comprises the steps of receiving a data stream comprising the program material encrypted according to a first encryption key, decrypting the program material; re-encrypting the program material according to a second encryption key; and storing the re-encrypted material in a media storage device. The program material is played back by retrieving the re-encrypted material from the media storage device and decrypting the re-encrypted program material. In one embodiment, the second encryption key is derived from metadata describing replay rights. In a further embodiment, the media storage device also stores the second encryption key which has been further encrypted by a key that is unique to the device used to receive the program material.

The apparatus comprises a tuner, for receiving a data stream comprising encrypted access control information and the program material encrypted according to a first encryption key, the access control information including a first encryption key; a conditional access module, for decrypting the encrypted access control information to produce a first encryption key; a first decryption module, for decrypting the program material using the first encryption key; an encryption module, for re-encrypting the decrypted program material according to a second encryption key and for encrypting the second encryption key according to a third encryption key to produce a fourth encryption key; and a second decryption module, for decrypting the fourth encryption key to produce the second encryption key using the third encryption key and for decrypting the re-encrypted program material using the second encryption key.

One object of the present invention is to provide a system allowing for growth to pay-per-play or true video-on-demand (VOD) services from media programs stored on a hard disk. The pay-per-play service allows the subscriber to select media programs or games from the real time broadcast data or from the media programs stored on the disk. VOD service permits the subscriber to purchase provided media programs and games from the subscriber's receiver instantly, without regard to the start time of the program.

Another object of the present invention is to provide for the reception and decryption of broadcast media programs, including impulse pay-per-view (IPPV) programs, that can be played and recorded onto storage media and allows playback at a later time with limited use. The data itself may be placed in short term storage, but the replay of the media programs can be accomplished with trick play functions such as forward, reverse, fast forward, fast reverse, frame advance, and pause functions.

Another object of the present invention is to provide PVR functions which provide recording, delayed playback, and trick play of IPPV media programs from the storage media without requiring a pre-purchase of the IPPV media program. This would allow the IPPV media program to be viewed without requiring the IPPV media program to be purchased prior to storage. Ideally, such a system would allow the user to select the IPPV media program from the storage device, subject to limited play rights.

Still another object of the present invention is to provide a pairing between the storage media and elements of the subscriber's IRD to assure that playback of the media programs from the storage device are permitted only with the proper IRD.

Still another object of the present invention is to provide a secure means for storing broadcast data streams (including IPPV and games) on a data storage device, while providing for adequate copy protection.

Still another object of the present invention is to provide a system and method for handling the archiving and retrieving of media programs and other data, even if the data storage device fails.

Still another object of the present invention is to provide a system and method that allows media program purchases to be recorded in a way that is analogous to that which is employed for real-time off-the-air programs.

Still another object of the present invention is to provide a system that provides a growth path to a system permitting IPPV media programs to be previewed without charge for an initial period of time with the option to purchase the media program or cancel the purchase, regardless of whether the program is retrieved from the storage device or obtained from a real time broadcast.

The present invention eliminates concerns regarding the proliferation of unauthorized digital copies of the media programs by use of a strong encryption method. Further, the present invention ensures that the stored material cannot be distributed since such decryption of the material can only be successfully performed by the encrypting IRD. At the same time, the present invention can be implemented with minimal changes to the IRD, and no changes to the CAM interface. The present invention also provides a basis for a growth path to more advanced encryption/decryption techniques.

BRIEF DESCRIPTION OF THE DRAWINGS

Referring now to the drawings in which like reference numbers represent corresponding parts throughout:

FIG. 4 is a block diagram illustrating a high-level block diagram of the IRD.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
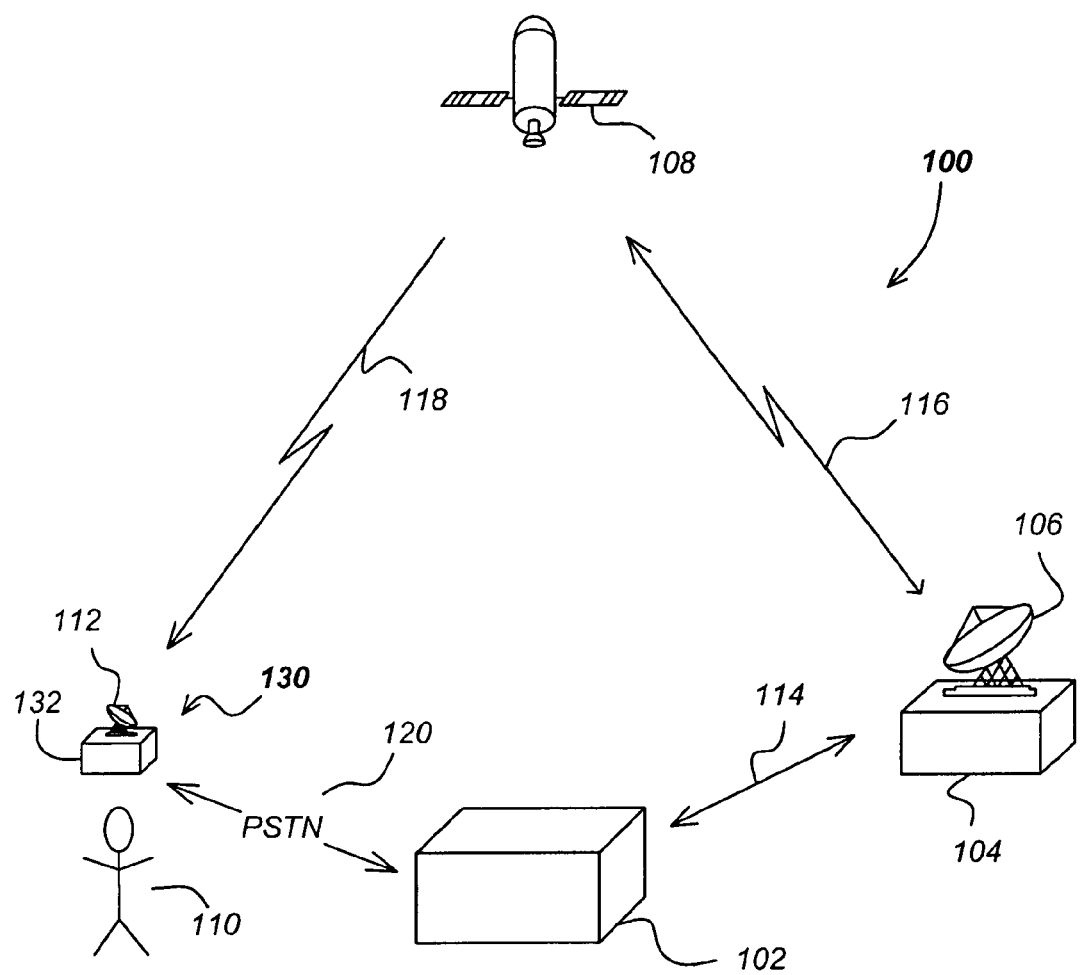
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108. The satellite 108 receives and processes this information, and transmits the video programs and control information to the IRD 132 at the receiver station 130 via downlink 118. The IRD 132 receives this information using a communicatively coupled subscriber antenna 112.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
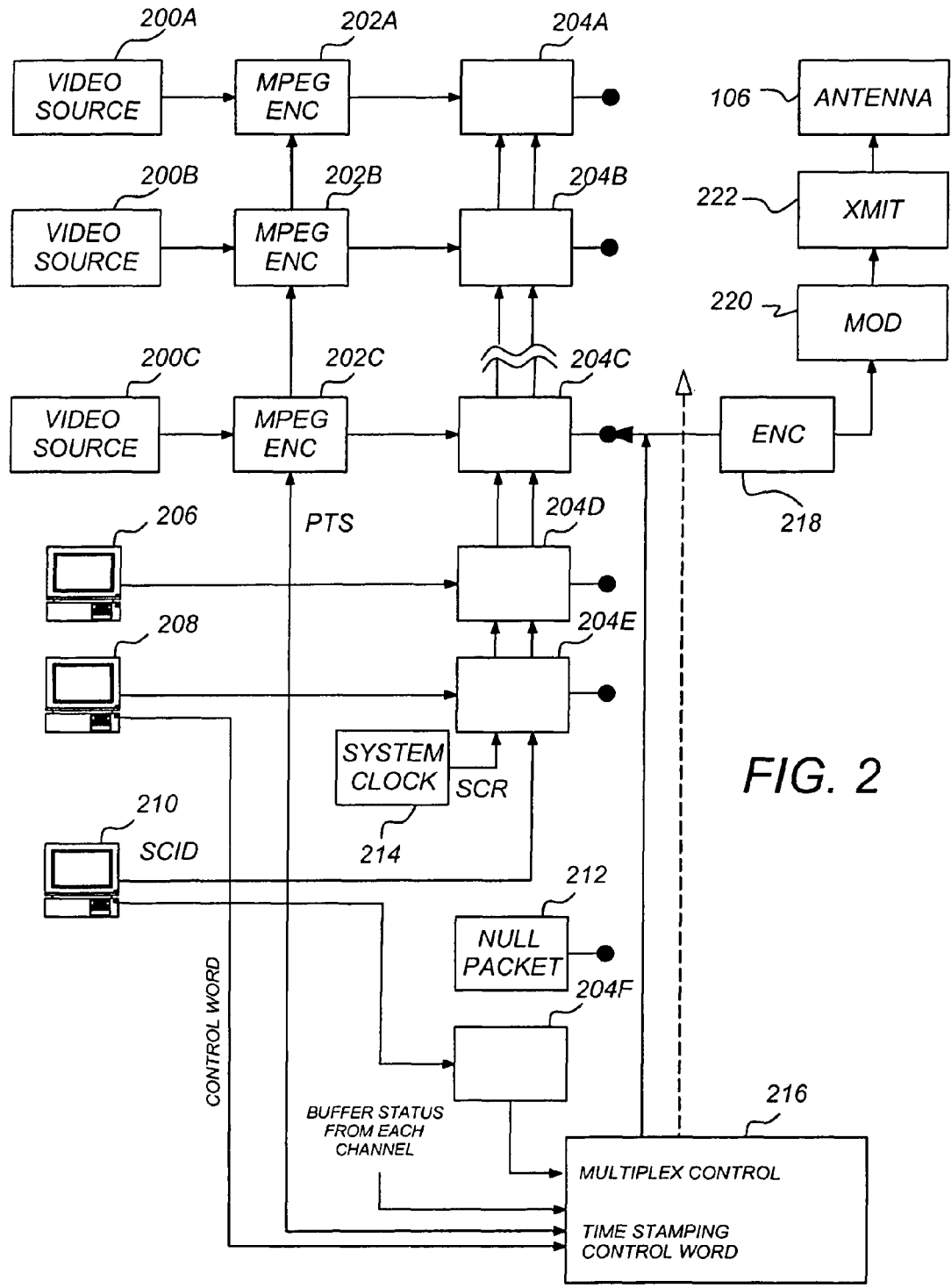
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A-200C (collectively referred to hereinafter as video source(s) 200). The data from each video program source 200 is provided to an encoder 202A-202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission).

After encoding by the encoders 202, the signals are converted into data packets by a packetizer 204A-204F (collectively referred to hereinafter as packetizer(s) 204) associated with each source 200, 206-210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figure 3A:
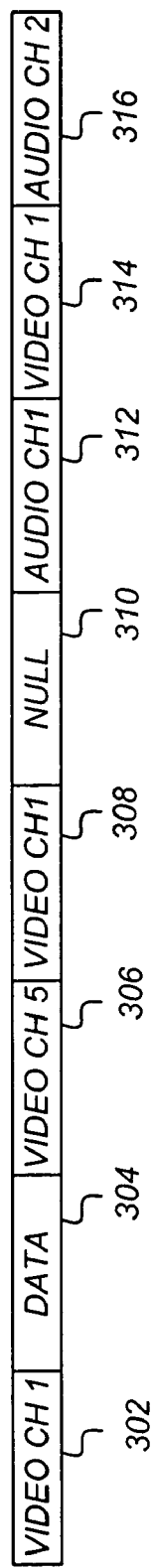
FIG. 3A is a diagram of a representative data stream received from a satellite.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 312 may be inserted into the data stream as desired.

Figure 3B:
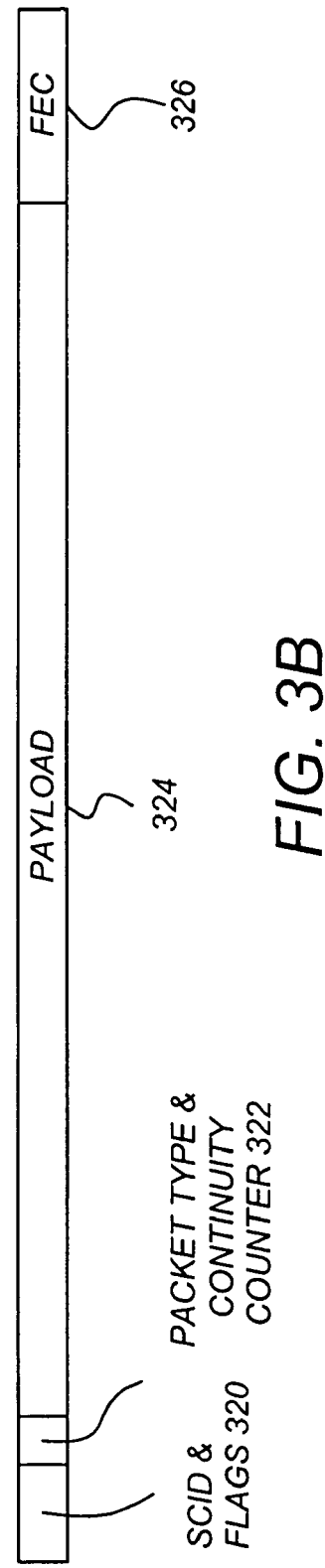
FIG. 3B is a diagram illustrating the structure of a data packet.

FIG. 3B is a diagram of a data packet. Each data packet (e.g. 302-316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including symmetric algorithms such as the data encryption standard (DES) and the asymmetric algorithms such as the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Requesting Pay-per-View Services

The data required to receive pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Ordering PPV media programs in advance using the PIP is limited, however, since the PIP is broadcast up to 24 hours before the media program itself is broadcast. Since the PIP is broadcast in real time, the IRD 132 does not acquire the PIP until the subscriber 110 actually requests the PPV media program purchase.

Subscriber Reception and Decryption of Media Programs

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs. The CAV 408 is communicatively coupled to a metadata analysis module (MAM) 411. Using the information in metadata table (e.g. Table 1 described below), the MAM 411 acts as a gate-keeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner 410 receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959.

Storage and Retrieval of Media Programs in Encrypted Form

Figure 5:
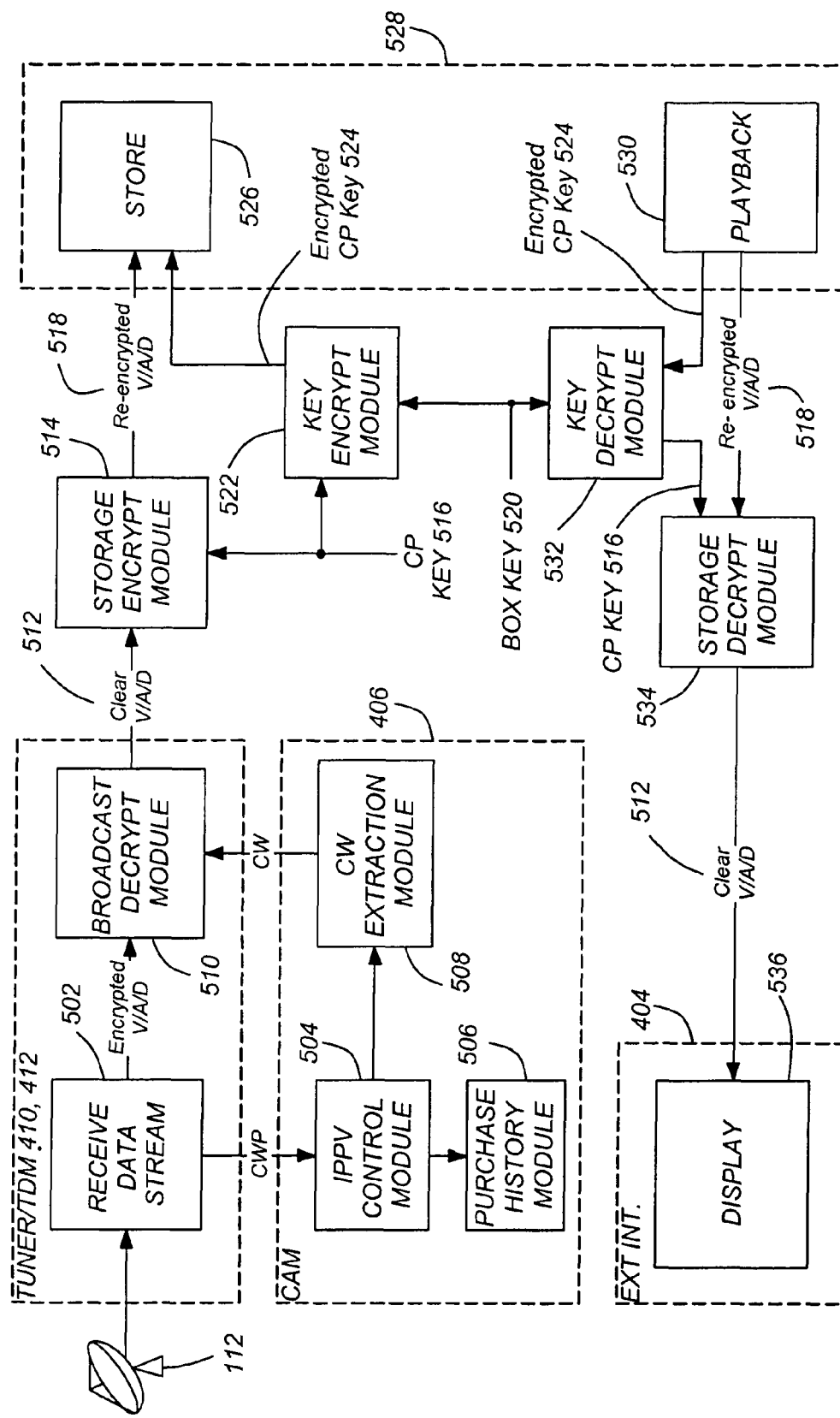
FIG. 5 is a diagram illustrating the storage and retrieval of data from a media storage device.

FIG. 5 is a diagram presenting exemplary method steps used to practice one embodiment of the present invention. A data stream is provided by subscriber antenna 112 and received by the tuner 410 and the TDM 412, as shown in block 502. The data stream includes a plurality of data packets which include the CWP, and program material that is encrypted according to a first (CW) encryption key. The data stream may also include metadata having replay rights. The replay rights are parameters necessary for controlling the replay of IPPV or pay-per-play services.

When the subscriber elects to purchase the media program, a viewing request is provided, and an IPPV control module 504 CAM 406 controls whether access to the requested media program will be provided. If so, the purchase history module 506 collects information required to send a bill for the media program to the subscriber 110. After the purchase history module 506 has acquired and recorded the required information, the IPPV control module 504 commands the CW extraction module 508 to decrypt the CWP to obtain the first (CW) encryption key. In one embodiment, this is performed using a complementary form of the I/O indecipherable algorithm that was used to encrypt the CW and other information to form the CWP. The resulting CW encryption key is provided to a broadcast decrypt module 510. The broadcast decrypt module 510 uses the CW key to decrypt the media program (hereinafter alternatively referred to as program material) to produce a clear (non-encrypted) version of the media program 512. The resulting clear media program 512 is applied to a storage encryption module 514, where the media program is re-encrypted according to a second copy protection (CP) encryption key 516. This is illustrated in box 514. In one embodiment, the CP key 516 is used to encrypt and decrypt the media program via an encryption technique such as RSA, or preferably, triple 56-bit DES, DES-X cipher block chaining (CBC).

DES is preferred because it is computationally more efficient than RSA in performing time-related computations. In one embodiment, the CP key 516 is a key that is unique to each IRD 132 and is stored therein.

The CP key 516 itself is then provided to a key encryption module 522, where it is encrypted with a third (box) encryption key 520 to produce a fourth encryption key (illustrated in FIG. 5 as Encrypted CP key 524). The box encryption key 520 is unique to each IRD 132, and is typically hardcoded in the IRD 132.

The re-encrypted program material 518 and the Encrypted CP key 524 is then stored in the media storage device 528 as shown in block 526. The media storage device 528 could include a hard disk drive, similar to that which is employed in personal computers, a optical-magnetic hard disk drive, an optical disk drive, or any other medium by which data may be recorded for subsequent playback.

When the subscriber 110 decides to view the recorded program material, a command is provided to the IRD 132 via the user I/O interface 420. The re-encrypted program material and the encrypted CP key 524 stored in the media storage device 528 are then retrieved, as shown in block 530. The encrypted CP key 524 is then provided to decryption module 532, where it is decrypted with the box key 520 to produce the CP key 516.

The CP encryption key 516 is then provided to the storage decryption module 534, where the program material is decrypted according to the CP key 516. The decrypted (and now clear) program material is now provided to a display 536 or other presentation device.

In one embodiment, the CP key 516 is modified with (e.g. by appending or adding) some or all of the metadata received in the broadcast data stream before being encrypted according to the box key 520. In this case, the encrypted CP key 524 not only includes the value of the CP key 516, but also, the metadata as well. When the encrypted CP key 524 is thereafter retrieved from the storage media 528 and de-encrypted with the box key 520, the CP key 516 and the metadata is recovered as well. This metadata can be compared to other data (e.g. the data and the time of day) to enforce the replay rights as required.

The CP key 516 can be stored in a transport chip within the TDM 412. This allows the present invention to be used with an unmodified CAM 406. This also permits rapid encryption and decryption of information stored in the media storage device 528, which is particularly advantageous where trick play functions are desired.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. For example, the encryption functions described herein could be performed by separate encryption/decryption modules, or a single multi-purpose encryption/decryption module can be utilized to perform the encryption/decryption functions of many separate modules.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of storing program material for subsequent replay, comprising the steps of:
   receiving a data stream comprising program material encrypted according to a first encryption key and metadata including information describing replay rights for the program material;
   decrypting the program material;
   re-encrypting the decrypted program material according to a second encryption key;
   encrypting the second encryption key and the metadata according to a third encryption key to produce a fourth encryption key; and
   storing the re-encrypted program material in a media storage device.

2. The method of claim 1, further comprising the steps of:
   retrieving the stored re-encrypted program material; and
   decrypting the retrieved re-encrypted program material.

3. The method of claim 2, further comprising the step of storing the fourth encryption key.

4. The method of claim 3, wherein the step of decrypting the retrieved re-encrypted program material comprises the steps of:
   reading the stored fourth encryption key;
   decrypting the fourth encryption key with the third key to produce the second encryption key and the metadata; and
   decrypting the re-encrypted program material using the second encryption key according to a comparison between the decrypted metadata and other data.

5. The method of claim 4, further comprising the steps of:
   accepting a viewing request before reading the stored fourth encryption key, and
   recording billing information regarding the program material.

6. The method of claim 1, wherein the second encryption key is derived at least in part from the metadata.

7. The method of claim 1, wherein the second encryption key is derived at least in part from a broadcast time of the program material.

8. The method of claim 1, wherein the step of encrypting the second encryption key and the metadata according to a third encryption key to produce a fourth encryption key comprises the step of modifying the second encryption key with the metadata; and
   encrypting the modified second encryption key according to a third encryption key to produce a fourth encryption key.

9. A receiver for storing program material for subsequent replay, comprising:
   a tuner, for receiving a data stream comprising encrypted access control information, metadata having information describing replay rights for the program material, and the program material encrypted-according to a first encryption key, the access control information including the first encryption key;
   a conditional access module, communicatively coupleable to the tuner, for decrypting the encrypted access control information to produce the first encryption key,
   a first decryptor module, communicatively coupled to the tuner and communicatively coupleable to the conditional access module, for decrypting the program material using the first encryption key, an encryptor, communicatively coupled to the first decryptor module and communicatively coupleable to a media storage device, for re-encrypting the decrypted program material according to a second encryption key and for encrypting the second encryption key and the metadata according to a third encryption key to produce a fourth encryption key, a second decryptor, communicatively coupleable to the media storage device, for decrypting the fourth encryption key to produce the second encryption key and the metadata using the third encryption key, and for decrypting the re-encrypted program material using the second encryption key according to a comparison between the decrypted metadata and other data.

10. The receiver of claim 9, further comprising:
a media storage device, for storing and retrieving the re-encrypted program material and the fourth encryption key.

11. The receiver of claim 9, wherein the second encryption key and the third encryption key are receiver-unique.

12. The receiver of claim 9, wherein the encryptor encrypts the second encryption key and the metadata by modifying the second encryption key with the metadata and encrypting the modified second encryption key according to the third encryption key to produce the fourth encryption key.

* * * * *